United States Patent
Itoh et al.

(10) Patent No.: US 8,077,977 B2
(45) Date of Patent: Dec. 13, 2011

(54) IMAGE PROCESSING SYSTEM, IMAGE PROCESSING METHOD, COMPUTER READABLE MEDIUM AND COMPUTER DATA SIGNAL

(75) Inventors: Atsushi Itoh, Kanagawa (JP); Yuzuru Suzuki, Kanagawa (JP); Hiroyuki Kawano, Kanagawa (JP); Kunikazu Ueno, Kanagawa (JP); Natsumi Miyazawa, Kanagawa (JP); Koichi Fujii, Kanagawa (JP); Shunsuke Kodaira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1179 days.

(21) Appl. No.: 11/798,741

(22) Filed: May 16, 2007

(65) Prior Publication Data

US 2008/0044086 A1    Feb. 21, 2008

(30) Foreign Application Priority Data

Aug. 15, 2006  (JP) .................................. 2006-221372
Aug. 15, 2006  (JP) .................................. 2006-221373

(51) Int. Cl.
G06K 9/46 (2006.01)
G06F 17/00 (2006.01)
(52) U.S. Cl. .......................... 382/190; 382/195; 715/210
(58) Field of Classification Search ................... 382/128, 382/132, 224, 209, 217, 218, 279, 190, 195, 382/107, 153; 375/240.11, 354; 73/861.48; 1/1; 370/517; 386/95, 111; 715/210
See application file for complete search history.

(56) References Cited

U.S. PATENT DOCUMENTS

| | | | |
|---|---|---|---|
| 6,243,419 B1 | 6/2001 | Satou et al. | |
| 6,421,463 B1 * | 7/2002 | Poggio et al. | 382/224 |
| 7,019,788 B2 | 3/2006 | Iizuka et al. | |
| 2004/0197727 A1 * | 10/2004 | Sachdeva et al. | 433/24 |

FOREIGN PATENT DOCUMENTS

| | | |
|---|---|---|
| JP | A-61-10388 | 1/1986 |
| JP | A 08-263505 | 10/1996 |
| JP | A-10-112837 | 4/1998 |
| JP | A-2002-262179 | 9/2002 |
| JP | A-2003-198975 | 7/2003 |
| JP | A-2003-259215 | 9/2003 |
| JP | A-2003-259282 | 9/2003 |
| JP | A-2004-080156 | 3/2004 |
| JP | A-2007-104284 | 4/2007 |

OTHER PUBLICATIONS

Office Action issued in Application No. JP2006/221373 on May 10, 2011 (with translation).
Mar. 2, 2011 Office Action issued in Japanese Patent Application No. JP 2006-221373 (with English translation).

* cited by examiner

*Primary Examiner* — Sheela Chawan
(74) *Attorney, Agent, or Firm* — Oliff & Berridge, PLC

(57) ABSTRACT

An image processing system includes an area extracting unit, an area relation extracting unit, a relation analyzing unit and an image display unit. The area extracting unit extracts areas from an input image. The area relation extracting unit extracts a relation between the areas extracted by the area extracting unit. The relation analyzing unit analyzes the relation between the areas extracted by the area relation extracting unit. The image display unit displays the image in accordance with an analysis result by the relation analyzing unit.

7 Claims, 9 Drawing Sheets

FIG. 5

| ID 511 | TOP LEFT COORDINATES 513 | BOTTOM RIGHT COORDINATES 515 | KIND 517 | INDEX 519 | RELATION PRESENCE/ABSENCE 521 | RELEVANT OBJECT COLUMN 523 | CONTENT 525 |
|---|---|---|---|---|---|---|---|
| TEXT 1 | x1, y1 | x2, y2 | TEXT | SUMMARY | RELEVANT | PHOTO 1, TEXT 2 | OOOOO |

FIG. 10

| ID | TOP LEFT COORDINATES | BOTTOM RIGHT COORDINATES | MAIN/ SUB KIND | INDEX | RELATION PRESENCE/ ABSENCE |
|---|---|---|---|---|---|
| TEXT 1 | x1, y1 | x2, y2 | SUB | TIME | OOOOO |
| | | | | | |

1511, 1513, 1515, 1517, 1519, 1521

IMAGE PROCESSING SYSTEM, IMAGE PROCESSING METHOD, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-221372 filed Aug. 15, 2006 and Japanese Patent Application No. 2006-221373 filed Aug. 15, 2006.

BACKGROUND

1. Technical Field

The invention relates to an image processing system, an image processing method, a computer readable medium storing an image processing program and a computer data signal.

2. Related Art

Services using a network represented by the Internet have been provided. Especially, servers provide, using WWW (World Wide Web), information, services or the like in the forms of documents such as a text (hereinafter referred to as an "HTML document") described in HTML (Hyper Text Markup Language).

On the other hand, software called a browser running on a client interprets the text such as the HTML document transmitted from the server to display it on the screen of an information terminal of the client.

Further, a radio communication technology represented by a mobile phone has been developed so that a portable information terminal compatible with the network has become widely used.

Since the portable information terminal requires a miniaturization so as to carry it, the size of a screen is more restricted than an ordinary compact and general-purpose computer. Therefore, most of the HTML document created for the display of the general-purpose computer and provided from the server may not be able to be displayed within the display of the portable information terminal at a time.

That is, there is a case that an electronic document larger than the size of the display for displaying the document is desired to be displayed and that it is desired to improve an operability and serviceability when the electronic document is browsed.

SUMMARY

According to an aspect of the invention, an image processing system includes an area extracting unit, an area relation extracting unit, a relation analyzing unit and an image display unit. The area extracting unit extracts areas from an input image. The area relation extracting unit extracts a relation between the areas extracted by the area extracting unit. The relation analyzing unit analyzes the relation between the areas extracted by the area relation extracting unit. The image display unit displays the image in accordance with an analysis result by the relation analyzing unit.

BRIEF DESCRIPTION OF THE DRAWINGS

Exemplary embodiments of the invention will be described below in detail with reference to the accompanying drawings, wherein:

FIG. 5 is an example of a data structure handled by the exemplary embodiment;

FIG. 10 is an example of a data structure handled by the other exemplary embodiment.

DETAILED DESCRIPTION

First Exemplary Embodiment

Now, exemplary embodiments of the invention will be described below with reference to the accompanying drawings.

Figure 1:
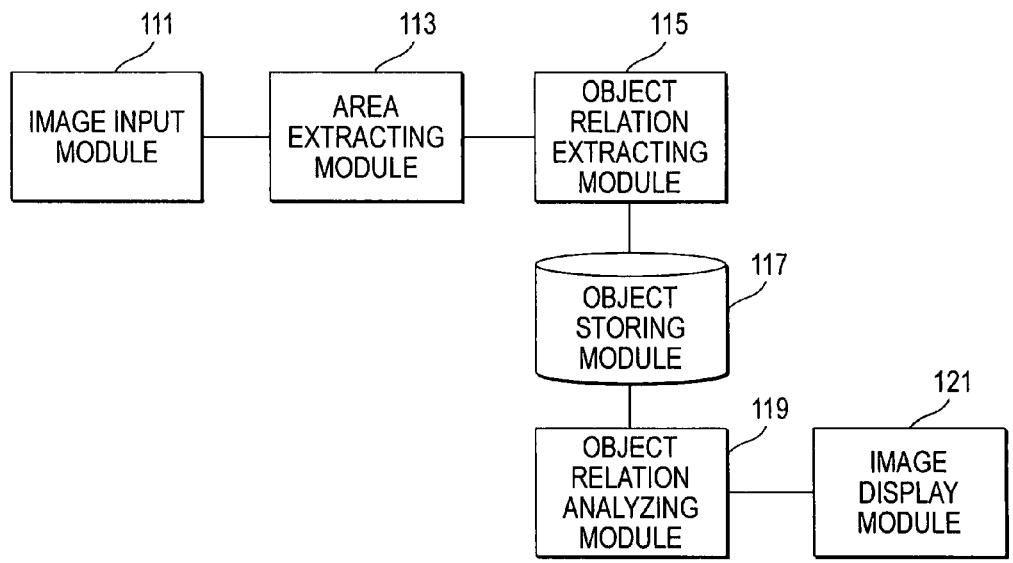
FIG. 1 is a block diagram showing a structural example among modules according to an exemplary embodiment.

Drawings respectively show the exemplary embodiments of the invention. FIG. 1 is a conceptual module block diagram according to an exemplary embodiment.

A "module" ordinarily designates parts such as software, hardware or the like that are separable logically. Accordingly, the "module" in this exemplary embodiment indicates not only a module in a system, but also a module in a program configuration and a hardware configuration. Therefore, this exemplary embodiment also embraces description on a system, a program and a method. Further, the modules substantially correspond to respective functions on one to one basis. However, in implementation, one module may be formed of one program or plural modules may be formed of one program. To the contrary, one module may be formed of plural programs. Further, the plural modules may be executed by one computer, or the one module may be executed by plural computers in a distributed or parallel environment. Further, a "connection" includes a logical connection as well as a physical connection, hereinafter.

Further, the system is formed by connecting plural computers, hardware, devices or the like through a network. In addition, the system may be sometimes realized by one computer, hardware, device or the like.

As an image, a document (a still image, a document created by an application software, etc.) is mainly exemplified and explained. The document includes areas of a text, figures such as graphs, tables, photographs or the like. Further, the document created by application software indicates an electronic document created by using document creating software (what is called a word processor).

An image processing system of this exemplary embodiment includes, as shown in FIG. 1, an image input module 111, an area extracting module 113, an object relation extracting module 115, an object storing module 117, an object relation analyzing module 119 and an image display module 121.

The image input module 111 is connected to the area extracting module 113 as shown in FIG. 1. A document to be processed by the image processing system is input to the image input module 111. Then, the image input module 111 sends the input document to the area extracting module 113. More specifically, as devices for inputting the document as an image, a scanner, a facsimile, etc. are exemplified. Further, what inputs a document created by application software may be a module for reading from a storage device such as a document data base and/or a receiving module for receiving a document from another system through a communication line.

The area extracting module 113 is connected to the image input module 111 and the object relation extracting module 115 as shown in FIG. 1. The area extracting module 113 extracts areas from an image input by the image input module 111. Then, the area extracting module 113 sends the extracted areas to the object relation extracting module 115. The area extracting module 113 extracts the areas by employing a layout analyzing process that, for example, extracts the areas each separated by blanks from the input image. It is to be understood that the areas may be extracted by another known method. Here, the image may be a single image or may be formed over plural pages.

The object relation extracting module 115 is connected to the area extracting module 113 and the object storing module 117 as shown in FIG. 1. With regard to the area extracted by the area extracting module 113, the object relation extracting module 115 extracts position information of the extracted area, relation between the extracted areas, kinds of the extracted area and index information of the extracted area. Then, the object relation extracting module 115 sends the extracted relation and the like to the object storing module 117.

The position information of each extracted area indicates a position of the extracted area in the input image. Specifically, a longitudinal direction of the input image is set as an X axis and a horizontal direction is set as a Y axis, and the position of each extracted image is represented by XY coordinates. Otherwise, the position information may be relative position information between the extracted areas.

The relation between the extracted areas indicates a physical relation such as the position information between the extracted areas and a semantic relation. Specifically, the position information between the extracted areas may indicate that an area 1 and an area 2 are arranged in a horizontal direction or that the area 1 and the area 2 are arranged above and below. Further, the semantic relation may indicate that explanation of the area 2 is included in the area 1.

The kind of the area indicates attributes of the area, that is, a text area, a graphic area, a table area, a photograph area, etc. Accordingly, a feature of each area is extracted, and attributes of each area are determined based on the feature. Other known methods than the extraction of the feature may be used. Further, here, the area having the attributes attached is also referred to as an "object."

The index information of the area indicates a name by which the area can be specified by a user, such as a title of the area. Specifically, a character recognition process is performed for a text in the text area, and the character recognition result of a first line of the text may be used as the index information of the text area. In order to extract more detailed index information, a structure analysis is executed based on characters obtained as the character recognition result, and a summary of the area may be used as the index information of the area. Further, a characteristic word (a word or the like that does not appear in other areas) may be extracted as the index information. Further, when the area is a photograph or a figure, an image thereof may be recognized.

The object storing module 117 is connected to the object relation extracting module 115 and the object relation analyzing module 119 as shown in FIG. 1. The object storing module 117 stores the relation between the areas extracted by the object relation extracting module 115 together with the image. That is, the object storing module 117 is a data base that stores the image and the information of the image (the position information of the areas in the image, the relation between the areas, the kinds of the areas and the index information of the areas) in association with each other. Contents of the data base are searched by the object relation analyzing module 119.

The structure of data stored by the object storing module 117 will be described with reference to FIG. 5.

As shown in FIG. 5, the object storing module 117 manages an ID column 511, a top left coordinate 513, a bottom right coordinate 515, a kind column 517, an index column 519, a relation presence/absence column 521, a relevant object column 523 and a content column 525 in the form of a table. In the ID column 511, a name that can be uniquely identified in the image is stored. In the top left coordinate column 513 and the bottom right coordinate column 515, the positions of the area in the image are stored. In the kind column 517, the kind of the area is stored. Thus, it can be discriminated which a text, a photograph or a figure the area. In the index column 519, the character recognition result by the object relation extracting module 115 is stored. In the relation presence/absence column 521, 'related' or 'unrelated' is stored. In the relevant object column 523, an identifier of the object having relation is stored. In the content column 525, the name of a file in which the image of the area is stored is stored. Further, if the area in question is a text area, a character string of the character recognition result may be stored in the contents column 525.

In the example shown in FIG. 5, the data structure is stored in the form of the table. However, other data structures (a link structure, a tree structure or the like) may be employed.

The object relation analyzing module 119 is connected to the object storing module 117 and the image display module 121 as shown in FIG. 1. The object relation analyzing module 119 analyzes the relation between the areas stored in the object storing module 117. Here, the analysis is used in displaying the area the next image display module 121. According to the analysis result, the data to be displayed on a screen is changed based on the information stored in the data base of the object storing module 117.

The image display module 121 is connected to the object relation analyzing module 119 as shown in FIG. 1. The image display model 121 displays the image in accordance with an analysis result by the object relation analyzing module 119. An image to be displayed includes an image in each extracted area.

Here, it is assumed that the screen for displaying images is smaller than an image to be displayed (an image of one page input by the image input module 111). Since the resolution of a scanner is improved, it is not suitable in most cases to directly display an image on the screen as it is. Ordinarily, the entire image is reduced. However, in this exemplary embodiment, the image is displayed for each area so that the relation between the areas can be understood.

Specifically, in response to a position relation between an area that is currently displayed on the screen and an area that is not displayed on the screen, explanation about the area that is not displayed on the screen is displayed. Alternatively, in response to a relation between areas, a form of the explanation may be changed. The explanation about an area may include the kind of the area, the index information of the area and, modification of the area that is not displayed on the screen.

Figure 2:
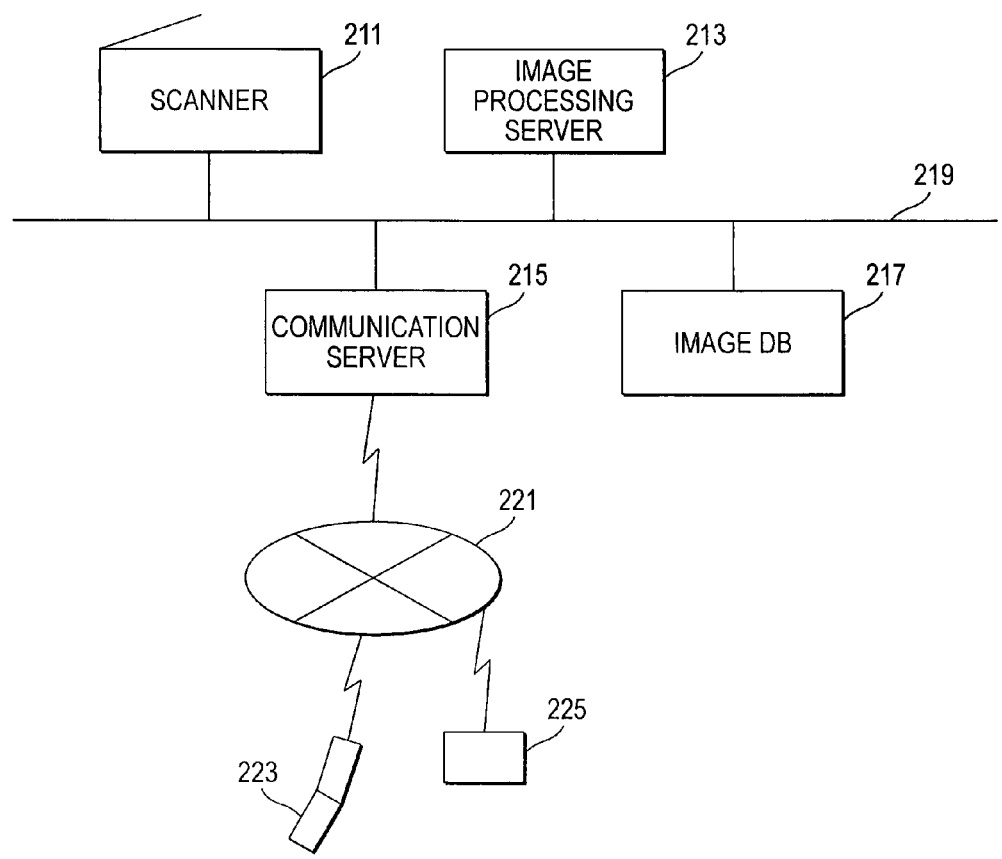
FIG. 2 is a block diagram showing a structural example of the entire part of a system according to the exemplary embodiments.

With reference to FIG. 2, the configuration of the entire system when this exemplary embodiment is realized will be described.

A scanner 211 corresponds to the image input module 111. An image processing server 213 executes the main functions of the exemplary embodiment described in FIG. 1. An image DB 217 corresponds to the object storing module 117. A communication server 215 communicates with a mobile phone 223 and a PDA 225 through a communication 221 to transmit an image. The scanner 211, the image processing server 213, the communication server 215 and the image DB 217 are connected to each other through a bus 219.

Further, the mobile phone 223 and the PDA 225 respectively have screens and correspond to the image display module 121 and displays images on their screens in accordance with the analysis result by the object relation analyzing module 119. Since the mobile phone 223 and the PDA 225 are portable, the size of a display screen is usually small.

A module configuration described in FIG. 1 is mainly implemented by the image processing server 213. However, the module configuration may be implemented by the scanner 211, the image DB 217, the communication server 215, the mobile phone 223 or the PDA 225. Also, the modules shown in FIG. 1 may be respectively distributed in these components.

Now, an operation and function (action) will be described below.

Figure 3:
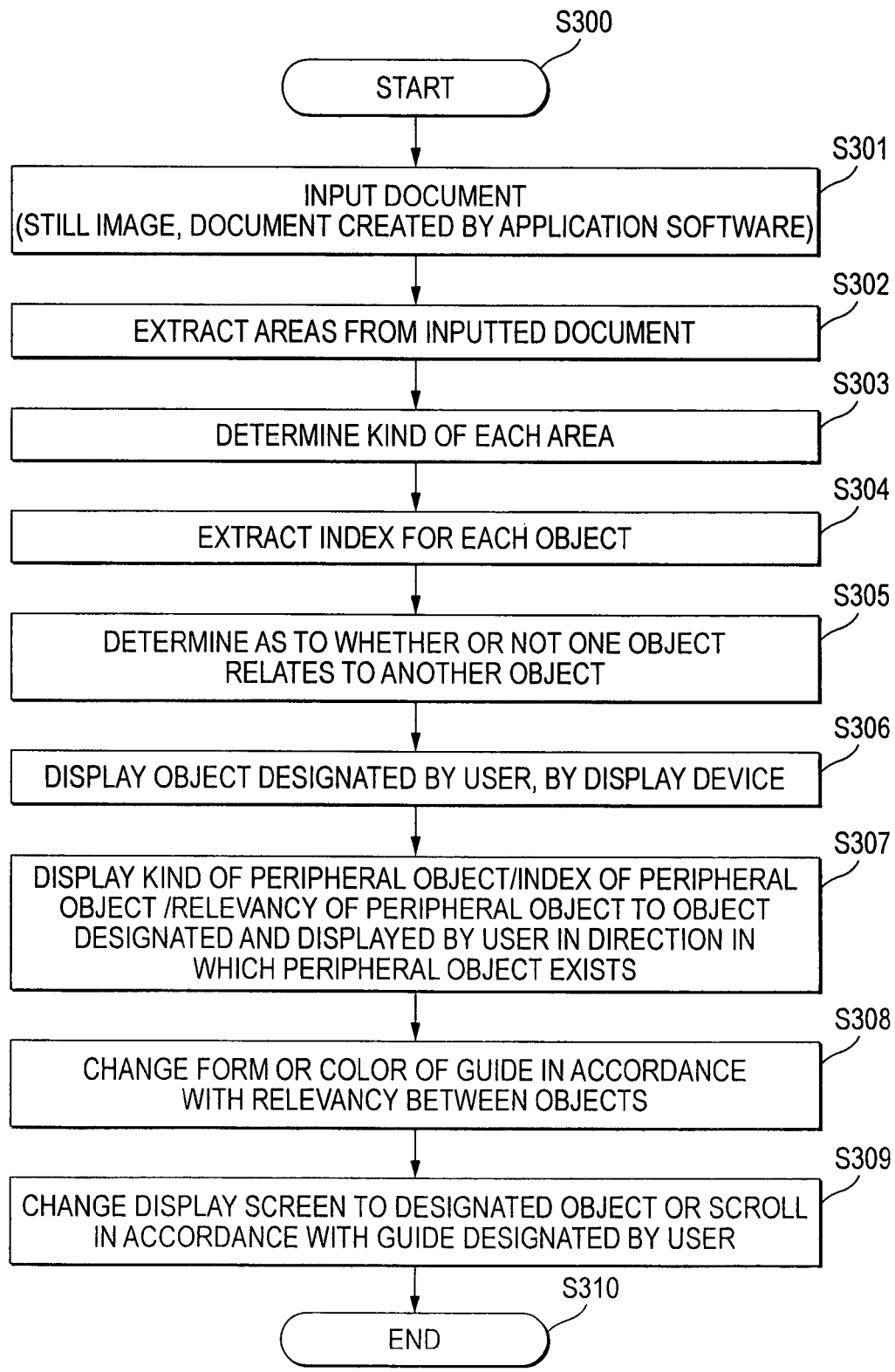
FIG. 3 is a flowchart for explaining an example of a process executed by the exemplary embodiment.

An example of a process executed by this exemplary embodiment will be described with reference to a flowchart of FIG. 3.

In step S301, the image input module 111 inputs a document.

In step S302, the area extracting module 113 extracts areas from the document input in the step S301.

In step S303, the object relation extracting module 115 determines a kind of each extracted area.

In step S304, the object relation extracting module 115 extracts an index of each object.

In step S305, the object relation extracting module 115 determines as to whether or not one object is relevant to another object to extract a relation between the objects. The results from the step S302 to the step S305 are stored in the object storing module 117.

In step S306, the image display module 121 displays an object on a display device in accordance with a user's designation.

In step S307, the image display module 121 displays guides of peripheral objects located around the displayed object in respective directions in which the respective peripheral objects are located. Each guide of the peripheral object include, for example, a kind of the peripheral object, an index of the peripheral object and a relation between the object designated by a user (the object that is currently displayed) and the peripheral object.

In step S308, the image display module 121 changes the form of each guide (a form, a pattern, color, a combination of them, etc.) in accordance with the relation between the objects.

In step S309, the image display module 121 changes the display screen to an object in accordance with a user's designation to the guide displayed in the step S307. Or, the object existing in the designated direction is displayed by scrolling.

One example of the process executed by this exemplary embodiment will be described with reference to FIG. 4.

An input document 411 is the image input by the image input module 111. In this example, that the image is a single-page image. As shown in FIG. 4, this image includes a text, a photograph and a drawing.

An extracted result 421 shows that process results by the area extracting module 113 and the object relation extracting module 115 are arranged to fit the position of the input document 411 for the purpose of easy understanding. That is, the input document 411 is divided into six areas including two columns of a right side and a left side and three rows of an upper row, a middle row and a lower row.

With regard to a top left area, its kind is a text, its ID (identifier) is Text 1, its index is "summary" and this area has a relation. An object to which the Text 1 is related includes Photo 1 and Text 2. That is, the kind of this area is the text area, the character recognition result for this area indicates the "summary", and the Photo 1 and the Text 2 are extracted by the positional physical analysis and the semantic analysis as the relation among objects.

Similarly, with regard to a top right area, its kind is a text, its ID (identifier) is Text 2, its index is "contents" and this area has relation. An object to which the Text 2 is related includes the Text 1 and Text 3.

With regard to an area in the left column and the second row, its kind is a photograph, its ID (identifier) is the Photo 1, its index is "female" and this area has relation. An object to which the Photo 1 is related includes the Text 1 and the Text 3.

With regard to an area in the right column and the second row, its kind is a text, its ID (identifier) is the Text 3, its index is "explanation" and this area has a relation. An object to which the Text 3 is related includes the Text 2 and the Photo 1.

With regard to a bottom left area, its kind is a figure, its ID (identifier) is Graph 1, its index is "Venn diagram" and this area has a relation. An object to which the Graph 1 is related includes Text 4.

With regard to a bottom right area, its kind is a text, its ID (identifier) is the Text 4, its index of "analysis" and this area has a relation. An object to which the Text 4 is related includes the Graph 1.

A display screen 431 shows that the image display module 121 mainly displays the object in the right column and the second row (the identifier is the Text 3) on the display device.

Figure 4:
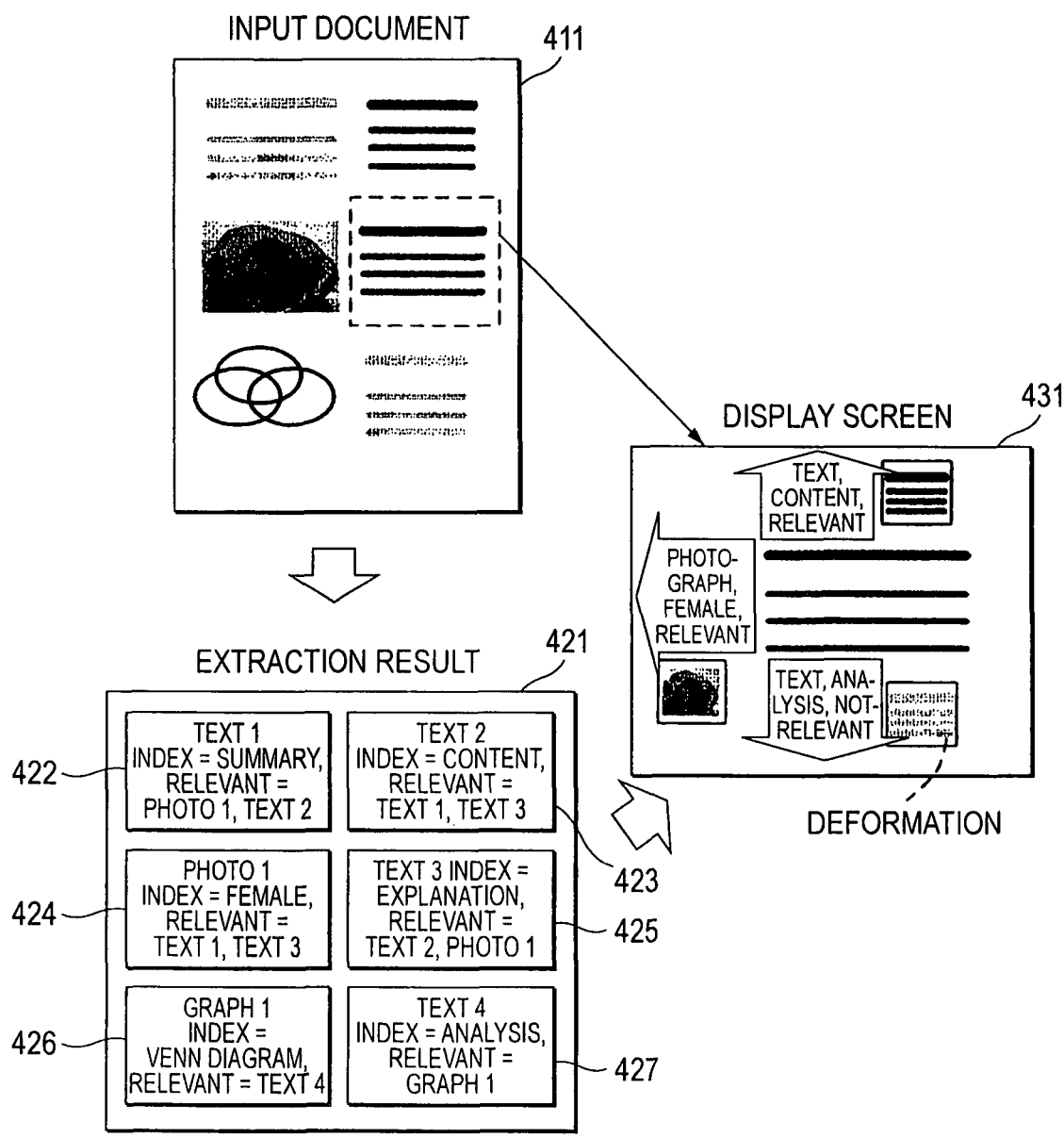
FIG. 4 is an explanatory view of one example of the process executed by the exemplary embodiment.

As shown in FIG. 4, the object in the right column and the second row designated by the user is displayed by using a large area of the screen.

Then, in an upper side of the displayed object, "text, contents, relevant" is displayed in an arrow mark. This means that the text area exists on the upper side of the currently mainly displayed object (referred to as a "current object"), that the index thereof is "contents" and that the text area has a relation to the current object. Further, in a position adjacent to the arrow mark, a reduced image of the identifier 'Text 2' is displayed. The display form of the identifier 'Text 2' is not limited to a reduced form, and may be deformed in such a display form as to recognize it as a text.

On a left side of the current object, "photograph, female, relevant" is displayed in an arrow mark. This means that that the photograph area exists on the left side of the current object, that the index thereof is "female" and that the photograph area has a relation to the current object. Further, in a position adjacent to the arrow mark, a reduced image of the identifier 'Photo 1' is displayed. It is to be understood that the displayed form is not limited to the reduced form, and may be deformed in such a display form as to recognize it as a photograph.

On a lower side of the current object, "text, analysis, not-relevant" is displayed in an arrow mark. This means that the text area exists on the lower side of the current object, that the index thereof is "analysis" and that the text area has no relation to the current object. That is, this indicates that the text area located on the lower side has no relation to the current object, or has an extremely small relation to the current object. Further, in a position adjacent to the arrow mark, the identifier Text 4 is reduced and displayed. It is to be understood that the displayed form is not limited to a reduced form, and may be deformed in such a display form as to recognize it as a text.

FE06-01460

The form of the arrow mark may be changed depending on the relation between the objects. For instance, if there is no relation, the arrow mark itself may not be displayed. Depending on the kind, the color thereof can be changed. Depending on whether or not there is the relation, the form of the arrow mark may be changed. The changed form may include blinking.

Second Exemplary Embodiment

Another exemplary embodiment of the invention will be described below.

To easily understand this exemplary embodiment, the summary of this exemplary embodiment will be described.

When a document (a still image, a moving image or a document created by application software or the like) is displayed by a display device having a small size such as a portable terminal, a predetermined area is enlarged and displayed and peripheral information of the displayed area (information of an area that is not displayed) or related information is presented to a user. Even when the display device has an enough size to display the entire document, the peripheral information of the displayed area or the related information is also presented to the user during enlarging and displaying the predetermined area.

For instance, as specific examples, below-described examples are exemplified.

(1) When a document is displayed by a display device such as a portable terminal, a guide about a peripheral area (object) that is not displayed (position information/index/relation/a kind of the object, etc.) is displayed or informed to a user. A display method (color/form or the like) is changed depending on contents of the guide.

(2) When a sport program as a moving image is watched through a portable terminal, a predetermined area is enlarged and displayed and a guide of an area that is not displayed and character information (time information/score information/flying distance information, etc.) annotated on a screen is displayed. When any of the information is selected, the selected information can be browsed or is superposed and displayed on the enlarged display of the predetermined area.

An "image" includes any of a still image, a moving image or a document such as an electronic document. In the following exemplary embodiment, it is assumed that an "image" is a moving image as an example. It is also assumed that the moving image includes a main image that a user especially desires to pay attention to and a sub-image on which information related to the main image is displayed.

Figure 7:
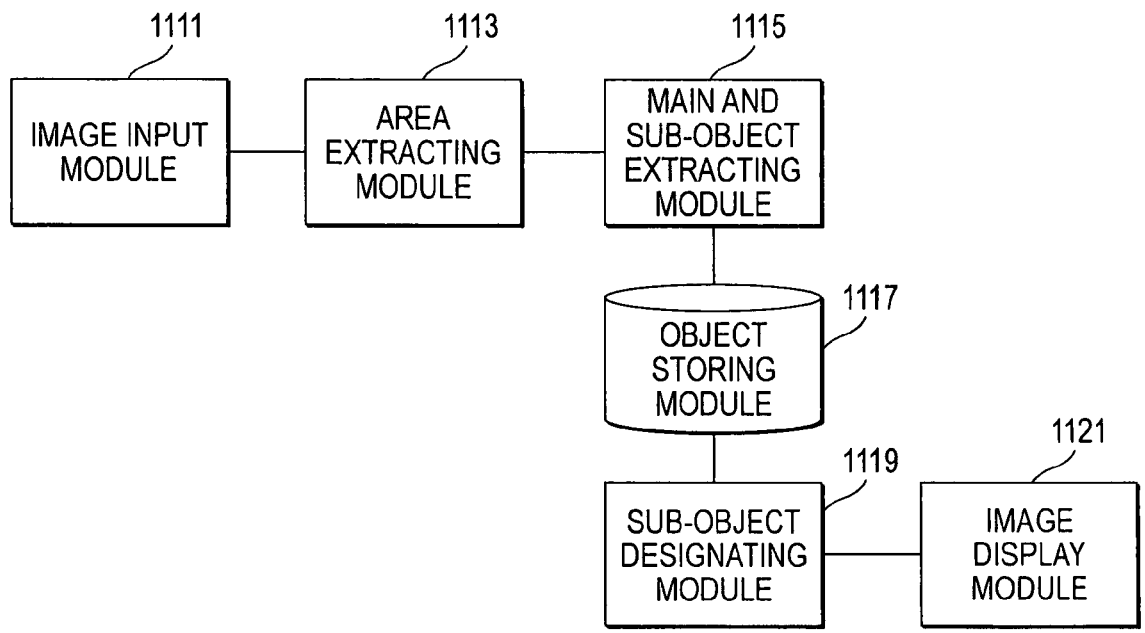
FIG. 7 is a block diagram showing a structural example among modules according to another exemplary embodiment.

An image processing system of this exemplary embodiment includes, as shown in FIG. 7, an image input module 1111, an area extracting module 1113, a main and sub-object extracting module 1115, an object storing module 1117, a sub-object designating module 1119 and an image display module 1121.

The image input module 1111 is connected to the area extracting module 1113 as shown in FIG. 7. A moving image to be processed by the image processing system is input to the image input module 1111. Then, the image input module 1111 sends the input moving image to the area extracting module 1113. The image input module 1111 inputs the moving image from a television, a DVD or the like as a digital image. More specifically, the image input module 1111 may be a converter that converts a broadcasted program into a digital image, cameras or the like. A scanner, a facsimile equipment, etc. are exemplified as a device for inputting a document that is a still image as an image. Further, what inputs a document created by application software may be a module that reads from a storage device such as a document data base and/or a receiving module for receiving a document from another system through a communication line.

The area extracting module 1113 is connected to the image input module 1111 and the main and sub-object extracting module 1115 as shown in FIG. 7. The area extracting module 1113 extracts areas from the image input by the image input module 1111. Then, the area extracting module 1113 sends the extract areas to the main and sub-object extracting module 1115. The area extracting module 1113 may extract the areas by extracting areas involving a strenuous movement and areas involving a predetermined movement from the moving image. It is to be understood that the areas may be extracted by another known method. Here, the moving image to be processed is handled as an image decomposed into frames, and an area involving a strenuous movement is detected by comparing images as frames. Here, the area extracting module 1113 extracts a rectangular area including an area involving a strenuous movement and/or a rectangular area that includes a partial image whose movement is less strenuous than that of the above-described area but changes at certain time intervals.

The main and sub-object extracting module 1115 is connected to the area extracting module 1113 and the object storing module 1117 as shown in FIG. 7. The main and sub-object extracting module 1115 extract an attribute indicating as to whether each area extracted by the area extracting module 1113 is a main image or a sub-image, position information of each extracted-area, index information of each area extracted by the area extracting module 1113. Then, the main and sub-object extracting module 1117 sends the extracted information to the object storing module 1117. Hereinafter, the area to which the attribute is attached may be referred to as an "object."

The position information of the main image or the sub-image indicates its position in the input image. Specifically, a longitudinal direction of the image is set as an X axis, a horizontal direction is set as a Y axis and a position of the main image or the sub-image is represented by XY coordinates. Otherwise, the position information may be relative position information between the main image and the sub-image.

With regard to the attribute indicating as to whether the area is the main image or the sub-image, it is assumed that a rectangular area including an area involving a strenuous movement is the main image and that a rectangular area whose movement is less strenuous than that of the main image but changes at certain time intervals is the sub-image.

The index information of the image indicates a name, such as a title of the area, by which the area can be specified by a user. Specifically, when a text is included in the area, characters of the text are recognized and a character recognition result can be employed. Further, there are many characters as in a sentence, in order to extract more detailed index information, a structure analysis may be executed based on the characters of the character recognition result to create a summary of the area. Further, a characteristic word (a word or the like that does not appear in other areas) may be extracted to generate the index information. Further, when the area is a photograph or a figure, the image thereof may be recognized.

The object storing module 1117 is connected to the main and sub-object extracting module 1115 and the sub-object designating module 1119 as shown in FIG. 7. The object storing module 1117 stores the attribute indicating as to whether each area is the main image or the sub-image, the position information of each area, the index information of each area, which are extracted by the main and sub-object extracting module 1115, and the image input by the image input module 1111 in association with each other. That is, the object storing module 1117 is a data base that stores the image and the information related to the image (the attribute indicating as to whether each area is the main image or the sub-image, the position information of each area, the index information of each area or the like) with associating the image with the information related to the image. Contents of the data base are searched by the sub-object designating module 1119.

The structure of data stored by the object storing module 1117 will be described with reference to FIG. 10.

As shown in FIG. 10, the object storing module 1117 manages an ID column 1511, a top left coordinate column 1513, a bottom right coordinate column 1515, a main and sub kind column 1517, an index column 1519 and a content column 1521 in the form of a table. In the ID column 1511, a name that can be completely identified in the image is stored. In the top left coordinate column 1513 and the bottom right coordinate column 1515, the positions of the areas in the image are stored. In the main and sub kind column 1517, the attribute indicating as to whether each area is the main image or the sub-image is stored. Thus, it can be discriminated as to whether each area is the main image or the sub-image. In the index column 1519, the character recognition result by the main and sub-object extracting module 1115 is stored. In the content column 1521, the name of a file in which the image of each area is stored is stored. Further, if an area is a text area, a character string of the character recognition result may be stored.

In the example shown in FIG. 10, the data structure is stored in the form of the table. However, other data structures (a link structure, a tree structure or the like) may be employed.

The sub-object designating module 1119 is connected to the object storing module 1117 and the image display module 1121 as shown in FIG. 7. The sub-object designating module 1119 designates the sub-image extracted by the main and sub-object extracting module 1115 in accordance with a user's selection. If there is only one sub-image, this selection is automatically carried out to select the sole sub-image, so that the user's selection is not required.

If there are plural sub-images, the main image is enlarged and displayed and explanations on the sub-images are displayed in directions in which the sub-images are present. Then, a user is allowed to select any of the explanations. A sub-image to be displayed is designated in accordance with the user's selection. Further, in accordance with the index information of the sub-image, the form of the explanation on the sub-image may be changed.

The image display module 1121 is connected to the sub-object designating module 1119 as shown in FIG. 7. The image display module 1121 displays the main image and the sub-image designated by the sub-object designating module 1119.

Here, it is assumed that a screen for displaying the image is smaller than the image input by the image input module 1111. Since the resolution of a camera has been improved, it is not suitable in most cases to directly display such an input image on the screen as it is. Generally, the entire image is reduced. However, in this exemplary embodiment, the main image is mainly displayed and the sub-image related to the main image is displayed in accordance with the user's selection.

With reference to FIG. 2, the structure of the entire part of the system by which this exemplary embodiment is implemented will be described.

A scanner 211 corresponds to the image input module 1111. An image processing server 213 performs the main functions of the exemplary embodiment described in FIG. 7. An image DB 217 corresponds to the object storing module 1117. A communication server 215 communicates with a mobile phone 223 and a PDA 225 through a communication 221 to transmit the image. The scanner 211, the image processing server 213, the communication server 215 and the image DB 217 are connected to each other through a bus 219.

Further, the mobile phone 223 and the PDA 225 respectively have screens and correspond to the image display module 1121 to display the images on their screens in accordance with an analysis result by the sub-object designating module 1119. Since the mobile phone 223 and the PDA 225 are portable, the size of a display screen is usually small.

The module configuration described with reference to FIG. 7 is mainly implemented by the image processing server 213. However, the module configuration may be implemented in the scanner 211, the image DB 217, the communication server 215, the mobile phone 223 or the PDA 225, or the modules shown in FIG. 7 may be respectively distributed in these members.

Now, an operation and function (action) will be described below.

Figure 8:
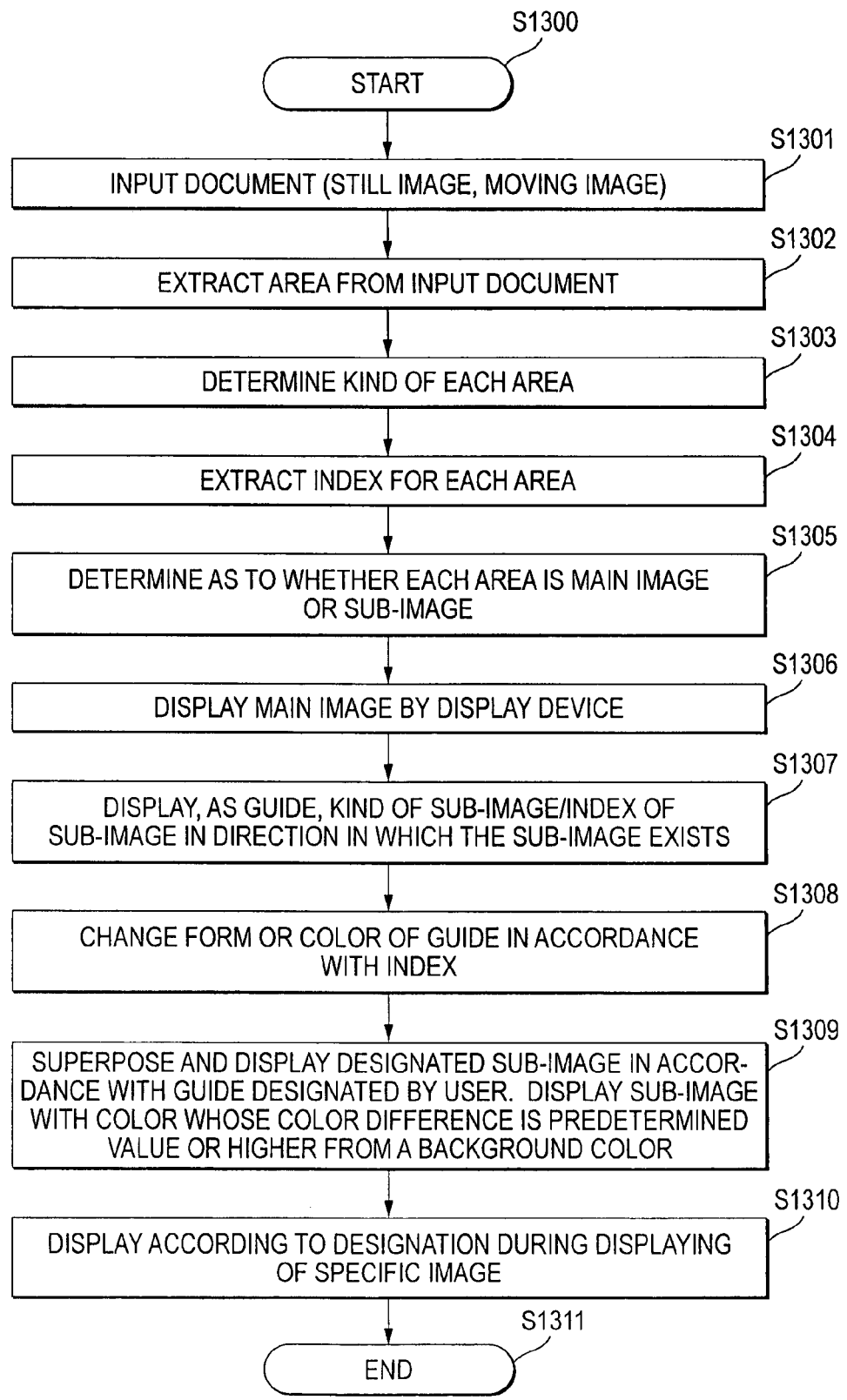
FIG. 8 is a flowchart for explaining an example of a process executed by the other exemplary embodiment.

An example of a process executed by this exemplary embodiment will be described with reference to a flowchart of FIG. 8.

In step S1301, the image input module 1111 inputs a document (including the still image and the moving image).

In step S1302, the area extracting module 1113 extracts areas from the document input in the step S1301.

In step S1303, the main and sub-object extracting module 1115 decides a kind of each extracted area.

In step S1304, the main and sub-object extracting module 1115 extracts an index for each object.

In step S1305, the main and sub-object extracting module 1115 determines as to whether each area is the main image or the sub-image. The results from the step S1302 to the step S1305 are stored in the object storing module 1117.

In step S1306, the sub-object designating module 1119 displays the main image on the display device.

In step S1307, the sub-object designating module 1119 displays the kind and index of the sub-images in the directions where the sub-images are present, as a guide.

In step S1308, the sub-object designating module 1119 changes the form of the guides (the configuration, the pattern, the color, the combination of them) in accordance with the indices of the sub-images.

In step S1309, the image display module 1121 superposes and displays the sub-image on the main image in accordance with the user's designation. When the sub-image is superposed on the main image, the sub-image is displayed with a color so that a color difference between the color and a background color is equal to or larger than a predetermined value. Thereby, the image can be easily seen by the user.

In step S1310, the image display module 1121 subsequently displays the sub-image in accordance with the designation made from the step S1307 to the step S1308 when a specific image is displayed (when there is the main image or the like). That is, when the moving image is an image to be processed, a part that is processed by this exemplary embodiment is mixed with a part that is not processed. When there is a frame that is processed by this exemplary embodiment, this is detected by the sub-object designating module 1119 and the image display module 11121 displays the main image and the sub-image.

An example of the process executed by this exemplary embodiment will be described with reference to FIG. 9.

Figure 9A:
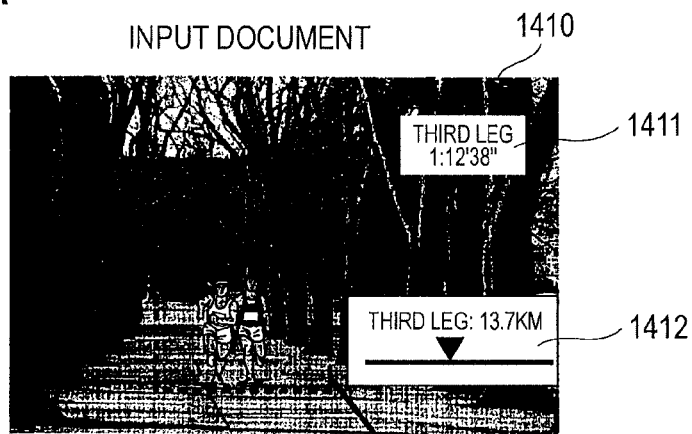
FIG. 9 is an explanatory view of one example of the process executed by the other exemplary embodiment.

FIG. 9A shows an example of an input document 1410 (a moving image) input by the image input module 1111. The input document 1410 shows an image of a long-distance relay race and information about the input image 1410 (an object 1411 showing elapsed time, an object 1412 showing current distance information) is included in the input image 1410.

Figure 9B:
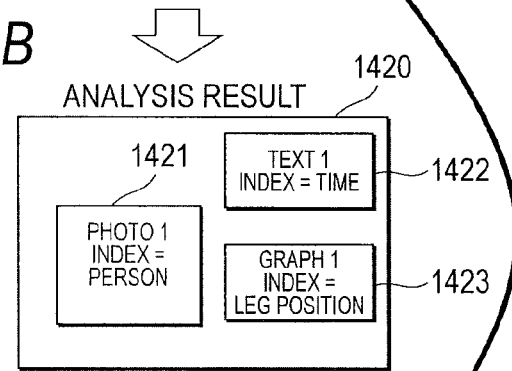

FIG. 9B shows an example of a result obtained by processing the input document 1410 by the area extracting module 1113 and the main and sub-object extracting module 1115. An object 1421 indicates a rectangular area involving a strenuous image, that is, the main image. Its identifier is "Photo 1" and its index information is "human being". An object 1422 indicates an image that changes less strenuously than the main image, but at certain time intervals, that is, the sub-image. Its identifier is "Text 1" and its index information is "time." Since the main and sub-object extracting module 1115 discriminates that this area (object 1422) is a character area, the kind of this area is designated as a "Text." An object 1423 indicates an image that changes less strenuously than the main image but at certain time intervals, that is, the sub-image. Its identifier is "Graph 1" and its index information is "block information." Since the main and sub-object extracting module 1115 discriminates that this area (object 1423) is a graphic area, the kind of this area is designated as a "Graph."

Figure 9C:
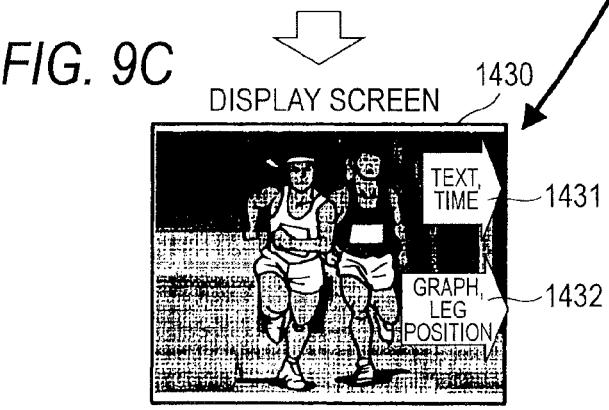

FIG. 9C is a screen displayed by the sub-object designating module 1119. That is, in a display screen 1460, the main image (the object 1421) is displayed. For the sub-images, the guides are displayed so as allow a user to select any of the sub-images. That is, as shown in FIG. 9C, an explanation 1431 as an arrow mark showing "character" and "time" and an explanation 432 as an arrow mark showing "graph" and "block position" are displayed in the right side of the main image. This is because in an original image (FIG. 9A), the object 1411 and the object 1412 are displayed in the right side of the main image.

Figure 9D:
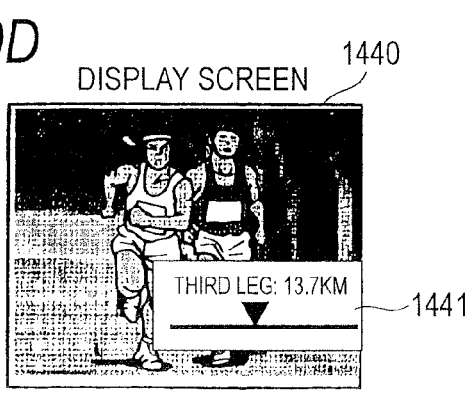
Figure 9A:
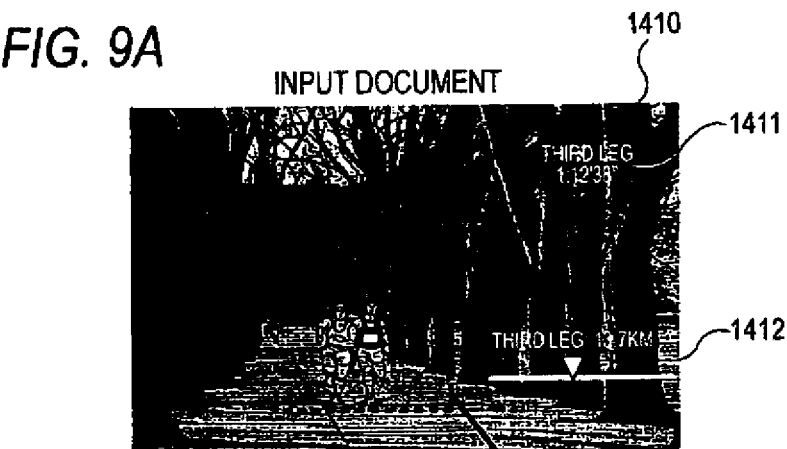
Figure 9B:
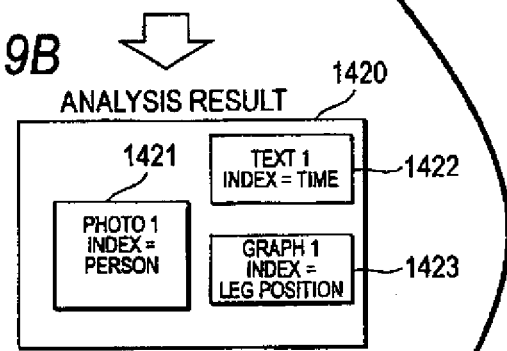
Figure 9C:
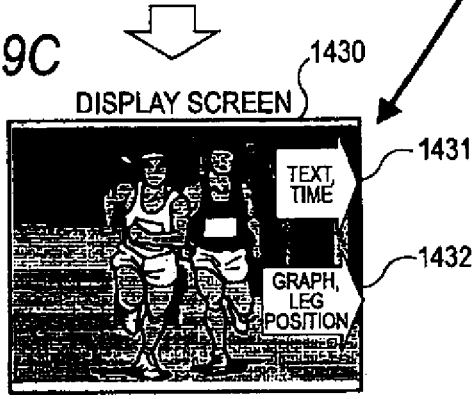
Figure 9D:
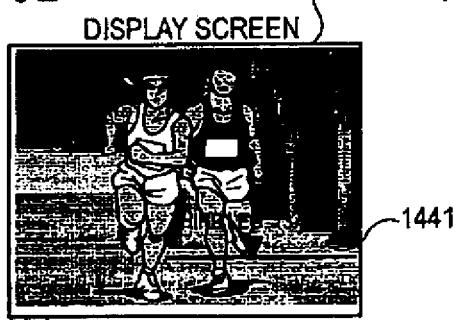
Figure 9E:
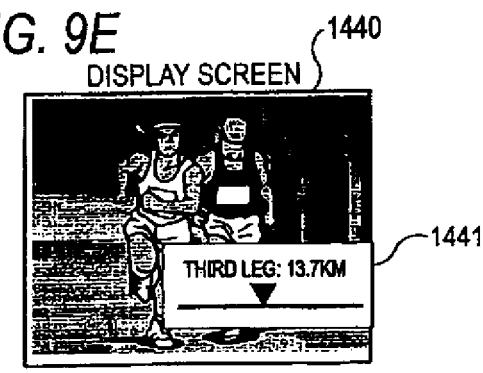

Here, it is assumed that the user selects the explanation 1432 (the block position). The screen displayed by the image display module 1121 at that time is shown in FIG. 9D or FIG. 9E. In FIG. 9D, the sub-image of the Graph 1 is displayed and superposed on the main image. When the color difference between the main image and the sub-image is not larger than the threshold value, for instance, as shown in FIG. 9E, a background of the rectangle may be colored with white and only a part that is changing in the sub-image may be extracted and displayed.

Figure 6:
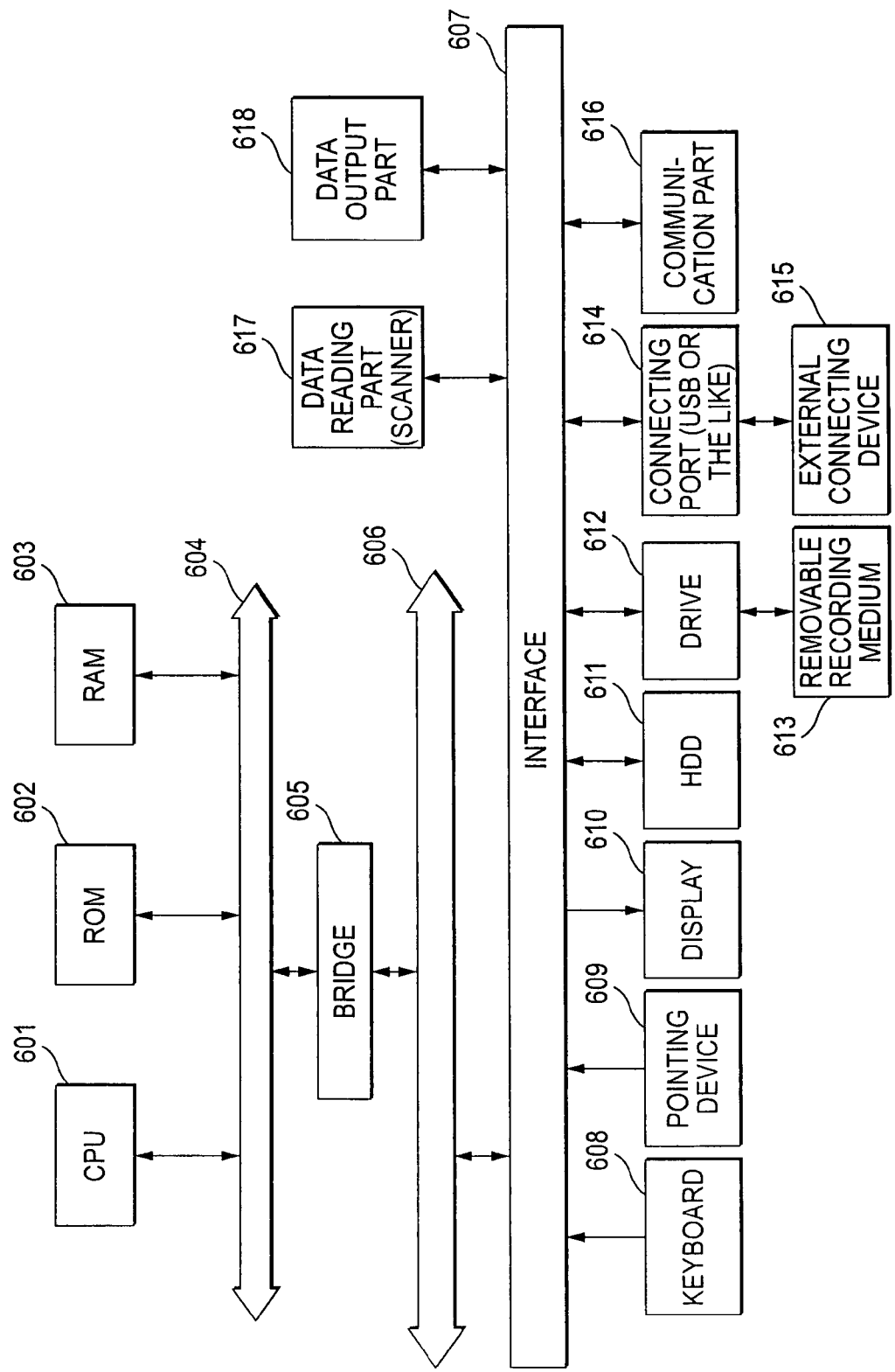
FIG. 6 is a block diagram showing a structural example of hardware of an image processing system according to the exemplary embodiments.

Referring to FIG. 6, a structural example of the hardware of the image processing system of the embodiment will be described. A structure shown in FIG. 6 illustrates the image processing system formed with, for instance, a personal computer (PC). In the hard structural example, a data reading part 617 such as a scanner and a data output part 618 such as a printer are included.

A CPU (Central Processing Unit) 601 is a control part for performing processes according to a computer program that describes the executing sequence of various kinds of modules explained in the above-described embodiment, that is, the modules including the area extracting module 113, the object relation extracting module 115, the object relation analyzing module 119 and the image display module 121.

A ROM (Read Only Memory) 602 stores programs or calculation parameters used by the CPU 601. A RAM (Random Access memory) 603 stores the programs used in the execution of the CPU 601 or the parameters properly changed in the execution. These members are connected together by a host bus 604 composed of a CPU bus.

The host bus 604 is connected to an external bus 606 such as a PCI (Peripheral Component Interconnect/Interface) bus through a bridge 605.

A pointing device such as a keyboard 608, a mouse or the like is an input device operated by an operator. A display 610 is composed of a liquid crystal display device or a CRT (Cathode Ray Tube) to display various kinds of information as texts or image information.

A HDD (Hard Disk Drive) 611 incorporates a hard disk to drive a hard disk and record or reproduce the programs or information executed by the CPU 601. The hard disk corresponds to the object storing module 117 for storing the image input by the image input module 111. Further, various kinds of computer programs such as other various kinds of data processing programs are stored in the hard disk.

A drive 612 reads data or the program recorded on a removable recording medium 613 such as a mounted magnetic disk, an optical disk, a photo-electromagnetic disk or a semiconductor memory to supply the data or the program to the RAM 603 connected through an interface 607, the external bus 606, the bridge 605 and the host bus 604. The removable recording medium 613 can be also used as a data recording area like the hard disk.

A connecting port 614 is a port for connecting an external connecting device 615 and has connecting parts such as USB, IEEE 1394 or the like. The connecting port 614 is connected to the CPU 601 through the interface 607, and the external bus 606, the bridge 605, the host bus 604 or the like. A communication part 616 is connected to a network to perform a data communication process with an external part. The data reading part 617 is, for instance, a scanner to perform a reading process of the document. The data output part 618 is, for instance, a printer to perform an output process of document data.

The structure of the hardware of the image processing system shown in FIG. 6 illustrates one structural example. The image processing system of this embodiment is not limited to the structure shown in FIG. 6 and any of structures that can execute the modules described in this embodiment may be employed. For instance, a part of the modules may be formed by exclusive hardware (for instance, ASIC, etc.). A part of the modules may be provided in an external system and connected by a communication line. Further, a plurality of the systems as shown in FIG. 6 may be mutually connected by the communication line so that the systems operate in cooperation. Further, the system may be incorporated in a copying machine, a facsimile equipment, a scanner, a printer, a compound machine (it is also referred to as a multi-functional copying machine and has the functions of the scanner, the printer, the copying machine, the facsimile equipment, etc.).

The above-described program may be stored in a recording medium (computer readable medium) and the program may be provided by a communication unit. In that case, for the above-described program, the invention may be understood as the invention of "a recording medium having a program recorded that can be read by a computer."

The "recording medium having a program recorded that can be read by a computer" means a recording medium having a program recorded that can be read by a computer, which is used for installing and executing the program and circulating the program.

As the recording medium, included are a digital versatile disk (DVD) such as "DVD-R, DVD-RW, DVD-RAM, etc." as a standard determined by a DVD forum, "DVD+R, DVD+RW, etc." as a standard determined by DVD+RW; a compact disk (CD) such as a read-only memory (CD-ROM), a CD recordable (CD-R), a CD re-writeable (CD-RW); a photoelectro magnetic disk (MO); a flexible disk (FD); a magnetic tap; a hard disk; a read only memory (ROM); an electrically erasable and rewriteable read only memory (EEPROM), a flash memory; a random access memory (RAM) etc.

Then, the above-described program or a part of the program is recorded on the recording medium so that the program can be stored or circulated. Further, the program can be transmitted by a communication, for instance, by using a local area network (LAN), a metropolitan area network (MAN), a wide area network (WAN), a wired network used by an internet, an intranet, an extranet or the like, or a radio communication network or further a transmitting medium of a combination of them, and the program can be transmitted by a carrier wave.

Further, the above-described program may be a part of other program or recorded on the recording medium together with a separate program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
    an image input unit that inputs an image;
    an area extracting unit that extracts areas from the image input by the image input unit;
    an area relation extracting unit that extracts a relation between the areas extracted by the area extracting unit;
    a storing unit that stores the relation between the areas extracted by the area relation extracting unit and the image input by the image input unit in association with each other;
    a relation analyzing unit that analyzes the relation between the areas stored by the storing unit; and
    an image display unit that displays the associated area stored in the storing unit in accordance with an analysis result by the relation analyzing unit on an image screen, wherein
    the image display unit displays an explanation in characters, the explanation (i) is generated based on the analysis result and (ii) relating to another of the areas that is not displayed on an image screen and that is adjacent to the displayed area in the input image.

2. The system according to claim 1, wherein the area relation extracting unit extracts position information of each area, a kind of each area and index information of each area.

3. The system according to claim 1, wherein the image display unit displays the explanation in accordance with a positional relation between the one area currently displayed on the image screen and the other area that is not displayed on the image screen.

4. The system according to claim 3, wherein the image display unit changes a form of the explanation in accordance with the relation between the areas.

5. The system according to claim 1, wherein:
    the area relation extracting unit extracts the area relation extracting unit extracts position information of each area, a kind of each area and index information of each area
    the image display unit displays, as the explanation, the kinds of the area that is not displayed on the image screen, the index information of the area that is not displayed on the image screen and deformation of the area that is not displayed on the image screen.

6. A non-transitory computer readable medium storing a program for causing a computer to execute a process for image processing, the image processing comprising:
    extracting areas from an input image;
    extracting a relation between the extracted areas;
    analyzing the extracted relation; and
    displaying one of the areas in accordance with an analysis result on an image screen, and
    displaying an explanation in characters, the explanation (i) being generated based on the analysis result and (ii) relating to another of the areas that is not displayed on the image screen and that is adjacent to the displayed area in the input image.

7. An image processing method comprising:
    extracting areas from an input image;
    extracting a relation between the extracted areas;
    analyzing the extracted relation; and
    displaying one of the areas in accordance with an analysis result on an image screen, and
    displaying an explanation in characters, the explanation (i) being generated based on the analysis result and (ii) relating to another of the areas that is not displayed on the image screen and that is adjacent to the displayed area in the input image.

* * * * *

UNITED STATES PATENT AND TRADEMARK OFFICE
CERTIFICATE OF CORRECTION

| | | |
|---|---|---|
| PATENT NO. | : 8,077,977 B2 | |
| APPLICATION NO. | : 11/798741 | |
| DATED | : December 13, 2011 | |
| INVENTOR(S) | : Atsushi Itoh et al. | |

It is certified that error appears in the above-identified patent and that said Letters Patent is hereby corrected as shown below:

In the Drawings

In the drawings, Fig(s) 9A-9D should be deleted and substitute therefore the attached figures 9A-9E as shown on the attached page 2 of 2.

Signed and Sealed this
Thirty-first Day of July, 2012

David J. Kappos
*Director of the United States Patent and Trademark Office*

INPUT DOCUMENT

ANALYSIS RESULT

DISPLAY SCREEN

DISPLAY SCREEN

DISPLAY SCREEN